(12) United States Patent
Bacarella

(10) Patent No.: US 6,323,474 B1
(45) Date of Patent: Nov. 27, 2001

(54) METHOD AND SYSTEM FOR MODULATING LIGHT

(75) Inventor: Antonio Vernon Bacarella, Dallas, TX (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/397,913

(22) Filed: Sep. 17, 1999

(51) Int. Cl.$^7$ .................................................... G01J 1/20
(52) U.S. Cl. .................................... 250/201.1; 250/208.2
(58) Field of Search .......................... 250/201.1, 207, 250/208.2, 214 VT, 205; 359/109

(56) References Cited

U.S. PATENT DOCUMENTS 6,066,844 * 5/2000 Ford et al. ........................ 250/208.2

* cited by examiner

Primary Examiner—Stephone B. Allen
(74) Attorney, Agent, or Firm—Baker Botts L.L.P.

(57) ABSTRACT

A system for modulating light is disclosed. The system comprises a detector (102) that receives input radiation (101) and generates detector data (104) representative of the input radiation (101). An information processor (106) receives the detector data (104) and generates control data (108). A filter (110) associated with the detector (102) receives the control data (108) and filters the radiation input into the detector (102) in response to the control data (108). A system for light modulation is disclosed. The system comprises a sensor (114) that receives input radiation (101) and generates detector data (104) representative of the input radiation (101). An information processor (106) receives and processes the detector data (104) and generates control data (108). A filter (110) receives the control data (108) and filters the radiation in response to the control data (108). A method for modulating light is disclosed. Step one calls for detecting input radiation (101) with a detector (102) to obtain detector data (104). Step two requires processing the detector data (104) to generate control data (108). Step three provides for transmitting control data (108) to a filter (110). The last step calls for filtering radiation with the filter (110) in response to the control data (108).

24 Claims, 1 Drawing Sheet

METHOD AND SYSTEM FOR MODULATING LIGHT

TECHNICAL FIELD OF THE INVENTION

This invention relates generally to the field of electro-optical systems and more specifically to a method and system for modulating light.

BACKGROUND OF THE INVENTION

Production of electro-optical systems requires modulating input light in order to selectively enhance and filter areas of an image. For example, a bright light source may wash out the image from an image intensifier tube, resulting in an image with little or no detail. Or, a bright source may wash out the portion of the area around the bright source, again causing the image to lose detail around the source. Known methods of modulating light have not been completely satisfactory at addressing this problem.

Known methods of modulating light include the mechanical chopper, electro-optical, acousto-optical, and gated system methods for accommodating bright light sources. Mechanical choppers utilize electrically-controlled mechanical means, for example, an aperature, to modulate light. Electro-optical modulation uses electrical means to control the refractive index of a crystal in order to modulate the amount of light that passes through the crystal. Similarly, acousto-optical modulation uses force applied to a crystal to modulate the amount of light that passes through the crystal. Gated systems switch an image intensifier tube on and off in order to accommodate bright sources. These known methods, however, are not detector oriented, and cannot modulate light in response to input light. Moreover, these methods often fail to produce sufficiently clear images because they often darken the whole image, causing the darker areas of the image to become less visible.

While these methods and systems have provided a significant improvement over prior approaches, the challenges in the field of electro-optical systems have continued to increase with demands for more and better techniques having greater effectiveness. Therefore, a need has arisen for a new method and system for modulating light.

SUMMARY OF THE INVENTION

In accordance with the present invention, a method and system for modulating light are provided that substantially eliminate or reduce disadvantages and problems associated with previously developed systems and methods.

A system for modulating light is disclosed. The system comprises a detector operable to receive radiation as an input and generate detector data, representative of the input radiation, as an output. An information processor is operable to receive and process the detector data and generate control data. A filter associated with the detector is operable to receive the control data and filter radiation input to the detector in response to the control data.

A system for light modulation is disclosed. The system comprises a sensor operable to receive radiation as an input and generate detector data, representative of the input radiation, as an output. An information processor is operable to receive and process the detector data and generate control data. A filter is operable to receive the control data and filter radiation in response to the control data.

A four-step method for modulating light is disclosed. Step one calls for detecting input radiation with a detector in order to obtain detector data. Step two requires processing the detector data to generate control data. Step three provides transmitting the control data to a filter. The last step calls for filtering radiation with the filter in response to the control data.

A technical advantage of the present invention is that it identifies light and dark areas of input radiation, allowing for proper modulation of the radiation to achieve a desired output image. Moreover, this advantage allows for a bright source to be identified and used to mark a specific point in the image. Another technical advantage of the present invention is that it can selectively modulate the amount of radiation at particular pixels of an image. This allows for filtering around a bright source in order to prevent the source from washing an image, without decreasing the quality of the darker areas of the image. Moreover, selectively decreasing the amount of input radiation dramatically improves the ability of range finding detectors to range a target in situations where the input radiation is not uniform. Furthermore, selectively decreasing radiation protects sensitive detectors and intensifiers from damaging radiation, thus extending the lifetimes of these parts, without sacrificing the quality of the output.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Figure 1:
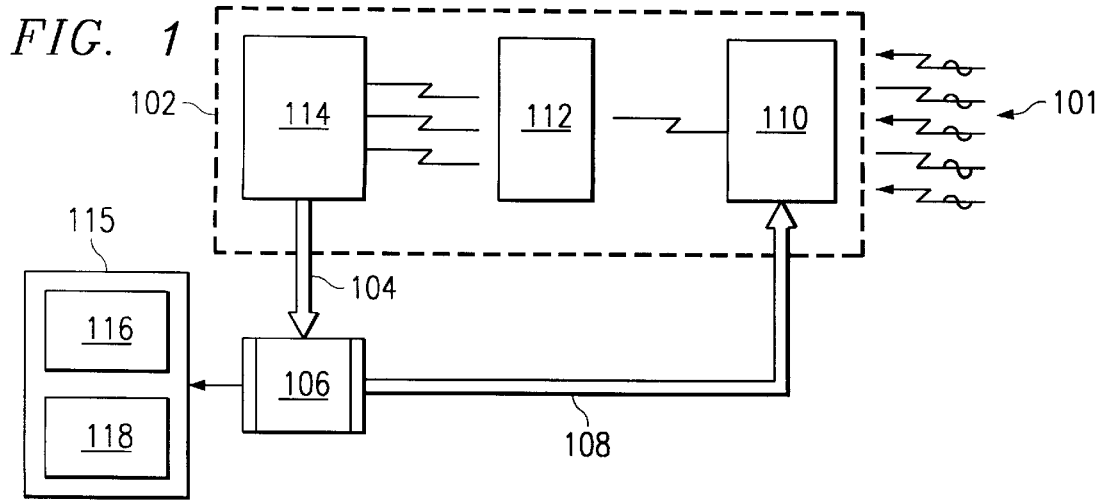
FIG. 1 is a system block diagram of one embodiment of the present invention.

FIG. 1 is a system block diagram of one embodiment of the present invention. In this embodiment, input radiation 101 enters a detector 102, which generates detector data 104 representative of the input radiation 101. The detector data 104 may represent, for example, a nighttime scene with a bright light source. The detector data 104 is sent to an information processor 106, which is operable to receive and process the detector data 104 in order to generate control data 108. A display 115 may be coupled to the information processor 106 and may comprise an information display 116 operable to display the detector data 104. The control data 108 is sent to a filter 110 associated with the detector 102. The control data 108 may, for example, direct the filter 110 to decrease the intensity of the bright light source. The filter 110 filters radiation input to the detector 102 in response to the control data 108. The filter 110 may comprise transmissive liquid crystal displays. In addition, the filter 110 may comprise layers. These layers may be offset in alignment to compensate for intra-pixel transmission. That is, the pixels on one layer may be offset to accommodate the areas between pixels on another layer. The detector 102 may further comprise an image intensifier tube 112, which may serve to, for example, enhance the nighttime scene, allowing a viewer to see objects not visible to the naked eye. The detector 102 may also comprise a sensor 114 for generating detector data 104. The sensor 114, may be, for example, a sensor array or a charged couple device array of sensors. In order to correlate the image input into the detector 102 with the output image of the detector 102, the input pixels of the filter 110 may be correlated with the output pixels of the detector 102. The display 115 may further comprise an image display 118 operable to display an image representative of the input radiation 101.

Figure 2:
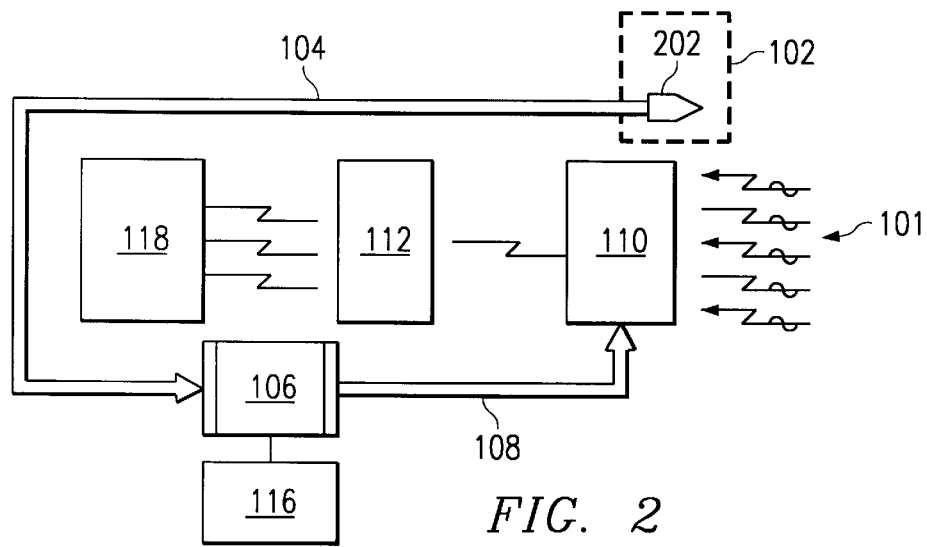
FIG. 2 is a system block diagram on another embodiment of the present invention.

FIG. 2 is a system block diagram of another embodiment of the present invention. Input radiation 101 enters a detector 102 which generates detector data 104 representative of the input radiation 101. The detector 102 may comprise a sensor 202, which may be, for example, a single biased radiation detector. An information processor 106 receives and processes the detector data 104 in order to generate control data 108. An information display 116 may be coupled to the information processor 106 and operable to display the control data 108. A filter 110 receives the control data 108 and filters the input radiation 101 in response to the control data 108. The filter 110 may comprise, for example, transmissive liquid crystal displays. The filter 110 may be layered. The layers may be offset in alignment to compensate for intra-pixel transmission. The filter 110 may filter the input radiation 101 to an image intensifier tube 112. An image display 118 may receive radiation from the image intensifier tube 112 and display an image representative of the input radiation 101.

Figure 3:
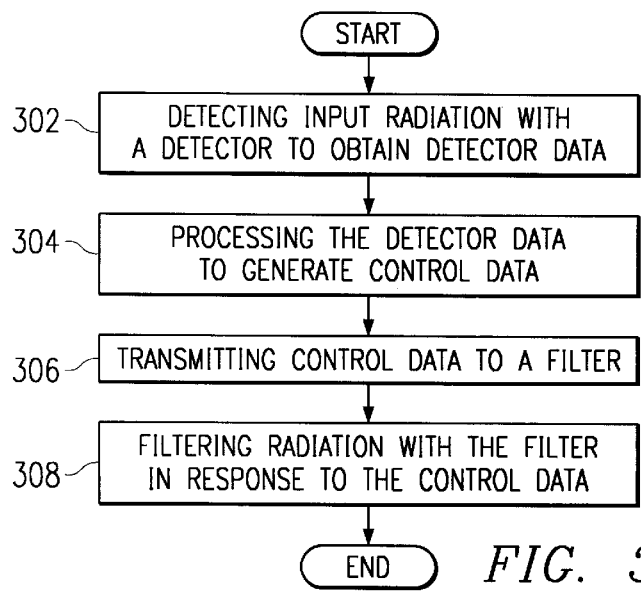
FIG. 3 is a flow chart demonstrating one method of modulating light in accordance with the present invention.

FIG. 3 is a flow chart demonstrating one method of modulating light in accordance with the present invention. The method starts with step 302, where a detector 102 detects input radiation 101 in order to obtain detector data 104. The input radiation 101 may be, for example, the image of a night scene. A sensor 202 may directly sense input radiation 101, or a sensor 114 may receive the radiation from an image intensifier tube 112 or a filter 110. The image intensifier tube 112 may be, for example, used to enhance the image of a night scene. In step 304, an information processor 106 receives and processes the detector data 104 in order to generate control data 108. The information processor 106 may correlate one or more output pixels of the detector 102 with one or more input pixels of the filter 110 in order to correlate the image input into the detector 102 with the output image of the detector 102. The control data 108 may direct the filter 110 to, for example, decrease the intensity of a bright light source, and may be displayed by an information display 116. In step 306, the control data 108 is transmitted to the filter 110. In step 308, the filter filters radiation in response to the control data 108 in order to control the amount of radiation. The filtering may be used to control the amount of radiation detected by the detector 102. The filtering may, for example, selectively decrease the amount of radiation. For example, suppose that a night scene contains one bright source. If left unfiltered, the bright source would wash out the night scene. If the whole image is darkened, the objects in the darker areas of the image would become even less visible. The present invention allows for selectively decreasing and increasing the amount of light, preventing a scene from washing out while allowing for enhancement of the darker areas. An image display 118 may display the radiation from the image intensifier tube 112. The foregoing steps of this method may be performed automatically using the information processor 106.

A technical advantage of the present invention is that it identifies light and dark areas of input radiation, allowing for proper modulation of the radiation to achieve a desired output image. Moreover, this advantage allows for a bright source to be identified and used to mark a specific point in the image. Another technical advantage of the present invention is that it can selectively modulate the amount of radiation at particular pixels of an image. This allows for filtering around a bright source in order to prevent the source from washing an image, without decreasing the quality of the darker areas of the image. Moreover, selectively decreasing the amount of input radiation dramatically improves the ability of range finding detectors to range a target in situations where the input radiation is not uniform. Furthermore, selectively decreasing radiation protects sensitive detectors and intensifiers from damaging radiation, thus extending the lifetimes of these parts, without sacrificing the quality of the output.

Although an embodiment of the invention and its advantages are described in detail, a person skilled in the art could make various alternations, additions, and omissions without departing from the spirit and scope of the present invention as defined by the appended claims.

What is claimed is:

1. A system for modulating light, the system comprising:
   a. a detector operable to receive radiation as an input and generate detector data, representative of the input radiation, as an output;
   b. an information processor operable to receive and process the detector data and generate control data;
   c. a filter associated with the detector and responsive to the control data and operable to filter radiation input to the detector in response to the control data; and
   d. an image display operable to generate an image from the filtered radiation.

2. The method of claim 1 wherein the detector has output pixels and the filter has input pixels correlated to the output pixels of the detector.

3. The system of claim 1 wherein the detector further comprises a sensor array for generating detector data.

4. The system of claim 1 wherein the detector further comprises a charged couple device array of sensors for generating detector data.

5. The system of claim 1 wherein the detector further comprises an image intensifier tube.

6. The system of claim 1 wherein the filter comprises transmissive liquid crystal displays.

7. The system of claim 1 wherein the filter is layered.

8. The system of claim 1 wherein the filter is layered and there is an offset in alignment.

9. The system of claim 1 further comprising an information display coupled to the information processor and operable to display the control data.

10. A system for modulating light, the system comprising:
    a. a detector operable to receive radiation as an input and generate detector data, representative of the input radiation, as an output;
    b. an information processor operable to receive and process the detector data and generate control data;
    c. a filter associated with the detector and responsive to the control data and operable to filter radiation input to the detector in response to the control data; and
    d. an image display and an image intensifier tube operable to display an image representative of the input radiation.

11. A method for modulating light, the method comprising:
    a. detecting input radiation with a detector to obtain detector data;
    b. processing the detector data to generate control data;
    c. transmitting the control data to a filter;
    d. filtering radiation with the filter in response to the control data; and
    e. generating an image from the filtered radiation.

12. The method of claim 11 wherein the processing step further comprises correlating one or more output pixels of the detector with one or more input pixels of the filter.

13. The method of claim 11 wherein the filtering step further comprises filtering radiation to control the amount of radiation detected.

14. The method of claim 11 wherein the filtering step further comprises decreasing the amount of radiation.

15. The method of claim 11 further comprising displaying the control data.

16. The method of claim 11 further comprising performing the foregoing steps automatically using an information processor.

17. A method for modulating light, the method comprising:
   a. detecting input radiation with a detector to obtain detector data;
   b. processing the detector data to generate control data;
   c. transmitting the control data to a filter;
   d. filtering radiation with the filter in response to the control data; and
   e. displaying the radiation from an image intensifier tube operable to receive radiation from the filter.

18. A system for light modulation, the system comprising:
   a. a detector operable to receive radiation as an input and generate detector data, representative of the input radiation, as an output;
   b. an information processor operable to receive and process the detector data and generate control data;
   c. a filter operable to receive the control data and filter radiation in response to the control data; and
   d. an image display operable to generate an image from the filtered radiation.

19. The system of claim 18 wherein the filter comprises transmissive liquid crystal displays.

20. The system of claim 18 wherein the filter is layered.

21. The system of claim 18 wherein the filter is layered and there is an offset in alignment.

22. The system of claim 18 further comprising an image intensifier tube operable to receive radiation from the filter.

23. The system of claim 18 further comprising an information display coupled to the information processor and operable to display the control data.

24. A system for light modulation, the system comprising:
   a. a detector operable to receive radiation as an input and generate detector data, representative of the input radiation, as an output;
   b. an information processor operable to receive and process the detector data and generate control data;
   c. a filter operable to receive the control data and filter radiation in response to the control data; and
   d. an image display and an image intensifier tube operable to display an image representative of the input radiation.

* * * * *